United States Patent [19]

Qi et al.

[11] Patent Number: 5,567,351
[45] Date of Patent: Oct. 22, 1996

[54] PHOSPHOR AND METHOD OF MAKING SAME

[75] Inventors: Ru-Yi Qi; Ronald E. Karam, both of Towanda; Vaddi B. Reddy, Sayre; James R. Cox, Monroeton, all of Pa.

[73] Assignee: OSRAM Sylvania Inc., Danvers, Mass.

[21] Appl. No.: 425,848

[22] Filed: Apr. 20, 1995

Related U.S. Application Data

[63] Continuation-in-part of Ser. No. 189,012, Jan. 28, 1994, abandoned, which is a continuation-in-part of Ser. No. 999,637, Dec. 31, 1992, abandoned.

[51] Int. Cl.$^6$ .................... C09K 11/69; C09K 11/59
[52] U.S. Cl. .................... 252/301.4 R; 252/301.4 F; 252/301.4 H
[58] Field of Search .................... 502/84; 423/332, 423/331; 252/301.4 H, 301.4 R, 301.4 F; 106/417, 415

[56] References Cited

U.S. PATENT DOCUMENTS

| | | | |
|---|---|---|---|
| 3,149,947 | 9/1964 | Eppler et al. | 65/33 |
| 3,149,982 | 9/1964 | Eppler | 106/39 |
| 4,045,241 | 8/1977 | Daimon et al. | 423/331 |
| 5,032,547 | 7/1991 | Giannelis et al. | 252/512 |
| 5,185,180 | 2/1993 | Kasenga et al. | 427/67 |
| 5,306,441 | 4/1994 | Reddy et al. | 252/301.4 F |

FOREIGN PATENT DOCUMENTS 2307863  12/1976  France.

OTHER PUBLICATIONS

Miyake et al, "Swelling and Dehydration Characteristics of Transition Metal Ion–exchanges Taeniolites", J. Mat'l. Sci., vol. 25, No. 12, Dec. 1990, 5096–100.

W. Eitel, R. Hatch, M. Denny, J. Amer. Cer. Soc., 36, 341–348 (1953) Oct.

K. Kuroda, M. Ogawa, T. Yanagisawa, & C. Kato, Layered Inorganic–Organic Nanocomposites: Application to Photofunctional Materials and Conversion to Inorganic Micropourous Materials, Nanophase and Nanocomposite Materials Symposium, Dec. 1–3 1992, Boston, MA, pp. 335–347.

K. Kitajima, K. Miyaka, & N. Takusagawa, Changes in Swelling Characteristics and Structure of Na–Fluorine Micas with Ga– and Al–Substitutions, J. Ceramic. Soc. Jpn. Int. Ed., 1991, 99(12), pp. 1174–1182. no month.

K. Kitajima and N. Daimon, Synthesis of Na–Fluor–Tetrasilicic Mica [NaMg$_{2.5}$(Si$_4$O$_{10}$)F$_2$] and its Swelling Characteristics, Nippon Kagaku Kaishi, (6), pp. 991–995 (1975) no month.

V. Luca, X. Chen, & L. Kevan, Chem. Mater. 3, pp. 1073–1081 (1991) no month.

H. Shell and K. Ivey, Fluoromicas, Bureau of Mines, U.S. Dept. of Interior Bulletin 647, pp. 123–144 (1969). no month.

*Primary Examiner*—Melissa Bonner
*Attorney, Agent, or Firm*—Robert F. Clark

[57] ABSTRACT

Inorganic intercalation phosphors were made by doping an inorganic intercalation compound having an atomic structure interspersed with vacant spaces with selected activator ions capable of luminescent emission when excited by ultraviolet light and/or cathode rays.

31 Claims, 1 Drawing Sheet

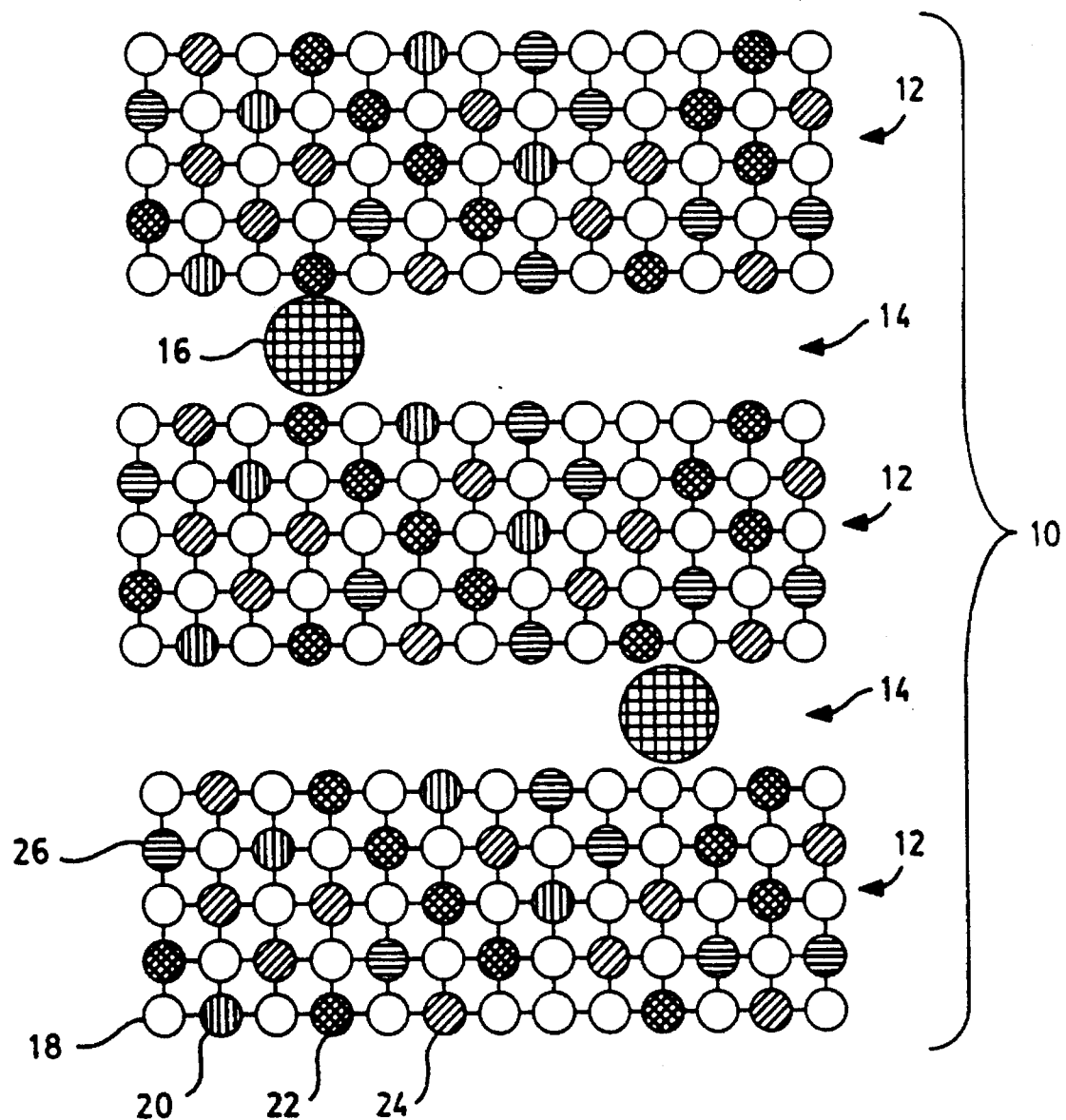

5,567,351

PHOSPHOR AND METHOD OF MAKING SAME

The United States Government has rights in this invention pursuant to U.S. Government Contract No. DAAL01-92-C-0241.

CROSS-REFERENCE TO RELATED APPLICATIONS

This application is a continuation-in-part of application Ser. No. 08/189,012, filed Jan. 28, 1994, now abandoned, which is a continuation-in-part of application Ser. No. 07/999,637, filed Dec. 31, 1992, now abandoned, the disclosures of which are hereby incorporated by reference. This application is related to copending applications Ser. Nos. 08/425,849, 08/425,536, and 08/425,535, all filed Apr. 20, 1995.

TECHNICAL FIELD

This invention relates to phosphors and methods of making them. In particular, it relates to inorganic intercalation phosphors made by doping inorganic intercalation compounds with selected activator ions which, when excited by ultraviolet light, cathode rays or other exciting radiation, are capable of luminescent emission.

BACKGROUND ART

In present day society, there exist numerous applications for phosphors. For example, phosphors are critical components in a number of lamp types, electroluminescent devices, and cathode ray tubes for televisions and computer monitors. Generally, the performance of these devices can be directly linked to the performance of the phosphors which they incorporate. Thus, in order to promote the evolution of these technologies, it is essential that new phosphors routinely be developed which could be used in those applications.

For lighting applications, it is desirable that phosphors luminesce when stimulated by ultraviolet radiation (UV), which is generally defined as the portion of the electromagnetic spectrum between about 4–400 nm. Such UV excitable phosphors are defined as being photoluminescent. Photoluminescent phosphors find use in a number of different lamp types including fluorescent, high pressure mercury and neon sign lamps. For fluorescent lighting applications, it is particularly important that phosphors be stimulable by the primary ultraviolet emissions from low pressure mercury discharges which occur at 185 and 254 nm.

For cathode ray tube applications, it is necessary that phosphors luminesce when excited by cathode ray radiation (CR), which consists of high energy electrons. Phosphors which are excited by cathode rays are defined as being cathodoluminescent. Although it is desirable that cathodoluminescent phosphors emit light over the entire range of the visible spectrum, phosphors that emit red, green and blue light are particularly important for use in the manufacture of luminescent screens for televisions and computer monitors.

Finally, most phosphors which are cathodoluminescent and/or photoluminescent are also electroluminescent and would likely be usable in electroluminescent devices. Thus, it would be an advantage in the art to provide novel phosphors which are capable of luminescent emission when excited by either ultraviolet radiation or cathode rays or both.

SUMMARY OF THE INVENTION

It is an object of this invention to provide an inorganic intercalation phosphor capable of luminescent emission when excited by ultraviolet and/or cathode rays.

It is a further object of this invention to provide a method for producing an inorganic intercalation phosphor.

In accordance with one object of the invention, inorganic intercalation phosphors having the general formula $M^a(Mg_2, M_x^b, M_y^c)LiSi_4O_{10}F_2$, where $M^a$ is Na or Li, $M^b$ and $M^c$ are selected from Pb, Nb, Tb, Ti, Sn, Mn, Eu, or Ce, and x is from about 0.0025 to about 0.2 and y is from 0 to about 0.2, are provided.

In accordance with yet another object of the invention, inorganic intercalation phosphors having the general formula $M^a(Mg_2, M_x^b, M_y^c)LiSi_4O_{10}F_2$, where $M^a$ is Na or Li, $M^b$ and $M^c$ are selected from Pb, Nb, Tb, Ti, Sn, Mn, Eu, or Ce, and x is from about 0.0025 to about 0.2 and y is from 0 to about 0.2, are made by the steps of: forming a mixture of stoichiometric amounts of MgO, $SiO_2$, $NaCO_3$, $LiCO_3$ or LiF or $LiNO_3$, $Na_2SiF_6$ or $(NH_4)_2SiF_6$ and an oxide, halide or carbonate of $M^b$ and $M^c$; and firing the mixture at a temperature between about 900° C. to about 1300° C. for between about 5 hours to about 36 hours to form the phosphor.

BRIEF DESCRIPTION OF THE DRAWINGS

The FIGURE is a schematic diagram representing the approximate atomic structure of fluorophlogopite, an inorganic intercalation compound.

BEST MODE FOR CARRYING OUT THE INVENTION

For a better understanding of the present invention, together with other and further objects, advantages and capabilities thereof, reference is made to the following specification and appended claims.

Numerous inorganic intercalation compounds are known. They generally have an atomic structure characterized by the presence of ionically bonded atoms in substructures interspersed with vacant spaces which are sufficiently large to accommodate foreign atoms or molecules within them. Intercalation compounds are generally of three types: lamellar, or layered, compounds; channel-type compounds; and cage-type compounds.

In lamellar intercalation compounds the atomic substructures comprise layers, or lamellae, of ionically bonded inorganic atoms. The lamellae themselves are bonded together by relatively weak forces, known as Van der Waals forces. The relatively weak Van der Waals forces between the lamellae permit the entry of foreign atoms or molecules into the spaces (hereinafter referred to as "Van der Waals spaces") between the lamellae. The Van der Waals spaces in lamellar intercalation compounds are large enough to accommodate foreign atoms or molecules which may be introduced by various methods, such as, for example, ion exchange, diffusion, acid-base reactions and electrochemical reactions.

In channel-type intercalation compounds the atomic substructures comprise zones of ionically bonded inorganic atoms which are interspersed with networks of vacant channels which are sufficiently large to accommodate foreign atoms or molecules within them. In cage-type intercalation compounds the atomic substructures of ionically bonded atoms are interspersed with vacant holes, or cages, which are sufficiently large to accommodate foreign atoms or molecules within them. The vacant channels or cages are interspersed throughout the atomic structure of the intercalation compound.

The lamellae of a crystal of a lamellar inorganic intercalation compound are generally parallel to the long axis of the crystal, whereas the channels of a channel-type inorganic intercalation compound crystal, and the cages or holes of a cage-type crystal, may be more randomly oriented.

Suitable inorganic intercalation compounds include vermiculites, micas, fluoromicas, xerogels (such as, for example, vanadium pentoxide made by sol-gel processing), iron oxychloride, zirconium phosphates, and zeolites.

Vermiculite is a lamellar intercalation compound which has the idealized general formula $(Ca,Mg)_{x/2}(Mg,Fe,Al)_3[(Al,Si)_4O_{10}](OH)_2$, where the first listed calcium and magnesium ions are exchangeable cations which reside in the interlamellar Van der Waals spaces, and x is any integer. Mica is another type of lamellar intercalation compound having the general idealized formula $M_x(Si_4O_{10})(OH)_2$, where M is an exchangeable cation, typically aluminum or magnesium, and x is any integer. Fluoromicas, which are similar in structure to vermiculites, have the general idealized formula $(Ca,Mg)_{x/2}(Mg,Fe,Al)_3[(Al,Si)_4O_{10}]F_2$. An example of a fluoromica is fluorophlogopite, which has the general formula $KMg_3(Si_3Al)O_{10}F_2$.

The FIGURE is a schematic representation of the lamellar atomic structure of fluorophlogopite. Fluorophlogopite 10 is comprised of atoms of oxygen 18, aluminum 20, silicon 22, magnesium 24 and fluorine 26 which are ionically bonded together into atomic substructures 12. Between the atomic substructures 12 are Van der Waals spaces 14 in which reside potassium atoms 16.

Zirconium phosphates have the general formula $Zr(MPO_4)_2 \cdot xH_2O$, where M is a monovalent exchangeable cation and x is any integer.

Zeolites are crystalline aluminosilicate intercalation compounds having an atomic structure which is interspersed with networks of channels and/or cages filled with exchangeable cations and water. Zeolites have the general formula $M_xD_y(Al_{x+2y}Si_{n-(x+2y)}O_{2n}) \cdot mH_2O$, where M is a monovalent or divalent exchangeable cation and x and y are any integers. The channels and/or cages within the zeolite structure are sufficiently large to accommodate foreign atoms or molecules within them, including organic polymers, which may be introduced by the previously described methods.

The inorganic intercalation compounds are doped with selected activator ions which are capable of luminescent emission under cathodoluminescent, fluorescent, x-ray or electroluminescent excitation. The following table lists several activator ions suitable for doping, along with the probable emission color from each. The precise emission colors obtained will depend on the site occupied by the particular activator ion in the lattice of the inorganic intercalation compound.

TABLE 1

| ACTIVATOR ION DOPANTS AND THEIR EMISSION COLORS | | |
|---|---|---|
| RED | GREEN | BLUE |
| $Mn^{+2}$ | $Mn^{+2}$ | $Sb^{+3}$ |
| $Mn^{+4}$ | $Eu^{+2}$ | $Ti^{+4}$ |

TABLE 1-continued

| ACTIVATOR ION DOPANTS AND THEIR EMISSION COLORS | | |
|---|---|---|
| RED | GREEN | BLUE |
| $Fe^{+3}$ | $Tb^{+3}$ | $Sn^{+2}$ |
| $Eu^{+3}$ | | $Tm^{+3}$ |
| $Sm^{+3}$ | | $Eu^{+2}$ |
| $Cr^{+3}$ | | $Ce^{+3}$ |

The activator ions may be doped into the atomic lattice of the inorganic intercalation compound by several methods, including high-temperature solid-state synthesis (generally in excess of 1000° C.), hydrothermal synthesis, wet-chemical procedures and low-temperature procedures. The activator ions generally occupy lattice sites within the atomic structure of the inorganic intercalation compound. For example, when an inorganic intercalation compound, such as fluorophlogopite, is doped with manganese ions, the manganese ions replace a small fraction of the magnesium ions in the fluorophlogopite atomic structure.

Fluxing agents, such as, for example, sodium chloride or barium chloride, may be used during the doping process, although they are not generally required.

The doped inorganic intercalation compound may be excited with, for example, cathode ray or ultraviolet radiation, to determine its luminescence intensity and its emission color. Luminescence intensity of the doped inorganic intercalation compound may be optimized by varying the amounts of the desired dopant ions.

Another lamellar intercalation compound is taeniolite. Luminescent forms of this fluoromica mineral have been made by doping the compound with various activator ions. These taeniolite phosphors have the general formula $M^a(Mg_2,M_x^b,M_y^c)LiSi_4O_{10}F_2$, where $M^a$ is Na or Li, $M^b$ and $M^c$ are activators selected from Pb, Nb, Tb, Ti, Sn, Mn, Eu, or Ce, and x is $0.0025 \leq x \leq 0.2$ and y is $0 \leq y \leq 0.2$. The general formula illustrates that the activator ions are believed to be substituting for magnesium ions in the taeniolite lattice. A properly charge compensated formula for these phosphors would be $M^a(Mg_{2-[x(vsb/2)+y(vsc/2)]},M_x^b, M_y^c)LiSi_4O_{10}F_2$, where vsb is the valence state of the $M^b$ activator ion and vsc is the valence state of the $M^c$ activator ion.

The taeniolite phosphors were made by mixing stoichiometric quantities of MgO, $SiO_2$, $NaCO_3$, $LiCO_3$ or LiF or $LiNO_3$, $Na_2SiF_6$ or $(NH_4)_2SiF_6$ and the oxide, halide or carbonate form of the activator and firing the mixture in air at a temperature between about 900° to about 1300° C. for between about 5 hours to about 36 hours to form the taeniolite phosphor. Longer firing times are preferred to ensure that substantially all of the $SiO_2$ is reacted. Specifically, the mixture is fired at about 915° C. for between about 15 hours to about 18 hours, ground, and refired at about 915° C. for between about 12 hours to about 15 hours to react substantially all of the $SiO_2$. A carbonaceous source such as graphite can be fired in the furnace with the mixture to either prevent the oxidation of the activator or reduce activator to a lower oxidation state. The air fired material may also be refired in a $N_2/4-5\%H_2$ atmosphere at about 850°–900° C. for about 2 hours to reduce the oxidation state of the activator.

The following non-limiting examples are presented. Most of the taeniolite phosphors in the examples were luminescent under both cathode ray (CR) and Ultraviolet (UV)

excitation. The unactivated forms of Na- and Li-taeniolite exhibited little or no emissions under either UV or CR excitation. Brightness measurements are given in foot-Lamberts(fL). Typical UV excitation was performed with the 254 nm line from a mercury discharge. Cathode ray excitation was typically performed using a focused high energy electron beam at 10 kV, 10 uA or 15 kV, 8 uA.

Na-taeniolite Phosphors

EXAMPLES 1–5

Lead activated Na-taeniolite, $Na(Mg_{2-x}Pb_x)LiSi_4O_{10}F_2$, was prepared by mixing stoichiometric amounts of MgO, $SiO_2$, $Na_2CO_3$, $Li_2CO_3$, $Na_2SiF_6$, and $Pb(NO_3)_2$ on a paint-shaker for 30 minutes. The starting materials thus mixed were charged into 100 ml alumina crucibles and fired at 915° C. for 18 hours, ground and refired at the same temperature for another 12 hours to react all the $SiO_2$. The ratios of MgO to $Pb(NO_3)_2$ were varied in amounts calculated to yield between 0.01 to 0.14 moles of lead per mole of phosphor.

|  | Example 1 | Example 2 | Example 3 | Example 4 | Example 5 |
|---|---|---|---|---|---|
| $SiO_2$ (g) | 22.66 | 22.66 | 22.66 | 22.66 | 22.66 |
| $Na_2SiF_6$ (g) | 6.45 | 6.45 | 6.45 | 6.45 | 6.45 |
| $Li_2CO_3$ (g) | 3.80 | 3.80 | 3.80 | 3.80 | 3.80 |
| $Na_2CO_3$ (g) | 1.8170 | 1.8170 | 1.8170 | 1.8170 | 1.8170 |
| MgO (g) | 8.25 | 8.12 | 8.04 | 7.88 | 7.71 |
| $Pb(NO_3)_2$ | 0.3407 | 1.3627 | 2.0440 | 3.4067 | 4.7694 |
| (moles Pb/mole phosphor) | (0.01) | (0.04) | (0.06) | (0.10) | (0.14) |
| UV Brightness (fL) | 0.57 | 0.72 | 0.75 | 0.64 | 0.58 |

The lead activated Na-taeniolite phosphor samples exhibited a blue emission under UV excitation with a 0.75 fL optimum photoluminescence at 0.06 moles of Pb/mole phosphor. The broad blue emission peak was centered at between about 420–435 nm. Pb-activated Na-taeniolite was not luminescent under CR excitation

EXAMPLES 6–10

Niobium activated Na-taeniolite, $Na(Mg_{2-2.5x}Nb_x)LiSi_4O_{10}F_2$, was prepared by mixing stoichiometric amounts of MgO, $SiO_2$, $Na_2CO_3$, $Li_2CO_3$, $Na_2SiF_6$, and $Nb_2O_5$ on a paint-shaker for 30 minutes. The starting materials thus mixed were charged into 100 ml alumina crucibles and fired at 915° C. for 18 hours, ground and refired at the same temperature for another 12 hours to react all the $SiO_2$. Activator levels between 0.02 and 0.11 moles of Nb per mole phosphor were realized by varying the amounts of MgO and $Nb_2O_5$.

The niobium activated Na-taeniolite phosphor samples exhibited a greenish white emission under UV excitation. The broad emission peak was centered at about 510 nm. Optimum CR brightness is 4.44 fL at 0.11 mole of Nb per mole Na-Taeniolite.

EXAMPLES 11–15

Terbium activated Na-taeniolite, $Na(Mg_{2-1.5x}Tb_x)LiSi_4O_{10}F_2$, was prepared by mixing stoichiometric amounts of MgO, $SiO_2$, $Na_2CO_3$, $Li_2CO_3$, $Na_2SiF_6$, and $Tb_4O_7$ on a paint-shaker for 30 minutes. The starting materials thus mixed were charged into 100 ml alumina crucibles and fired at 915° C. for 15 hours, ground and refired at the same temperature for another 15 hours to convert all the $SiO_2$. The phosphors were then fired in 4% $H_2/N_2$ atmosphere at 850° C. for 2 hours which improved the brightness by 30–50%. Activator levels between 0.04 and 0.14 moles of Tb per mole phosphor were prepared by varying the ratio of MgO and $Tb_4O_7$.

|  | Example 6 | Example 7 | Example 8 | Example 9 | Example 10 |
|---|---|---|---|---|---|
| $SiO_2$ (g) | 22.66 | 22.66 | 22.66 | 22.66 | 22.66 |
| $Na_2SiF_6$ (g) | 6.45 | 6.45 | 6.45 | 6.45 | 6.45 |
| $Li_2CO_3$ (g) | 3.80 | 3.80 | 3.80 | 3.80 | 3.80 |
| $Na_2CO_3$ (g) | 1.8170 | 1.8170 | 1.8170 | 1.8170 | 1.8170 |
| MgO (g) | 8.08 | 7.67 | 7.46 | 7.25 | 7.05 |
| $Nb_2O_5$ (g) | 0.2533 | 0.7598 | 1.0130 | 1.2663 | 1.5196 |
| (moles Nb/mole phosphor) | (0.02) | (0.06) | (0.07) | (0.09) | (0.11) |
| CR Brightness (fL) | 2.43 | 3.61 | 4.12 | 3.99 | 4.44 |

|  | Example 11 | Example 12 | Example 13 | Example 14 | Example 15 |
|---|---|---|---|---|---|
| $SiO_2$ (g) | 22.66 | 22.66 | 22.66 | 22.66 | 22.66 |
| $Na_2SiF_6$ (g) | 6.45 | 6.45 | 6.45 | 6.45 | 6.45 |
| $Li_2CO_3$ (g) | 3.80 | 3.80 | 3.80 | 3.80 | 3.80 |
| $Na_2CO_3$ (g) | 1.8170 | 1.8170 | 1.8170 | 1.8170 | 1.8170 |
| MgO (g) | 8.04 | 7.79 | 7.67 | 7.54 | 7.42 |
| $Tb_4O_7$ (g) | 0.7691 | 1.5382 | 1.9227 | 2.3072 | 2.6918 |
| (moles Nb/mole phosphor) | (0.04) | (0.08) | (0.10) | (0.12) | (0.14) |
| CR Brightness (fL) | 0.83 | 1.42 | 1.52 | 1.10 | 1.08 |

The terbium activated Na-taeniolite phosphors exhibited a green emission when excited by UV and CR radiation with peak emission occurring at about 540 nm. The optimum CR brightness, 1.52 fL, was realized at 0.10 moles of Tb per mole of phosphor.

EXAMPLES 16–20

Tin activated Na-taeniolite, $Na(Mg_{2-x}Sn_x)LiSi_4O_{10}F_2$, was prepared by mixing stoichiometric amounts of MgO, $SiO_2$, $Na_2CO_3$, $Li_2CO_3$, $Na_2SiF_6$, and $SnCl_2 \cdot 2H_2O$ on a paint-shaker for 30 minutes. The starting materials thus mixed were charged into 100 ml alumina crucibles and fired at 915° C. for 18 hours, ground and refired at the same temperature for another 12 hours to react all the $SiO_2$. The ratios of MgO and $SnCl_2 \cdot 2H_2O$ were varied in amounts calculated to yield between 0.004 to 0.04 moles of tin per mole of phosphor.

|  | Example 16 | Example 17 | Example 18 | Example 19 | Example 20 |
|---|---|---|---|---|---|
| $SiO_2$ (g) | 22.66 | 22.66 | 22.66 | 22.66 | 22.66 |
| $Na_2SiF_6$ (g) | 6.45 | 6.45 | 6.45 | 6.45 | 6.45 |
| $Li_2CO_3$ (g) | 3.80 | 3.80 | 3.80 | 3.80 | 3.80 |
| $Na_2CO_3$ (g) | 1.8170 | 1.8170 | 1.8170 | 1.8170 | 1.8170 |
| MgO (g) | 8.27 | 8.24 | 8.22 | 8.21 | 8.12 |
| $SnCl_2 \cdot 2H_2O$ (g) | 0.0928 | 0.2785 | 0.3714 | 0.4642 | 0.9284 |
| (moles Sn/mole phosphor) | (0.004) | (0.012) | (0.016) | (0.02) | (0.04) |
| UV Brightness (fL) | 0.12 | 0.39 | 3.03 | 3.59 | 2.65 |

The tin activated Na-taeniolite phosphor samples exhibited a bluish white emission under UV excitation with a 3.59 fL optimum photoluminescence at an activator level of 0.02 moles of tin/mole phosphor. The broad emission peak was centered at about 470 nm. No emission was observed under CR excitation.

EXAMPLES 21–25

Titanium activated Na-taeniolite, $Na(Mg_{2-2x}Ti_x)LiSi_4O_{10}F_2$, was prepared by mixing stoichiometric amounts of MgO, $SiO_2$, $Na_2CO_3$, $Li_2CO_3$, $Na_2SiF_6$, and $TiO_2$ on a paint-shaker for 30 minutes. The starting materials thus mixed were charged into 100 ml alumina crucibles and fired at 915° C. for 18 hours, ground and refired at the same temperature for another 12 hours to react all the $SiO_2$. Phosphors having several different Ti activator levels between 0.02 and 0.16 moles of Ti per mole phosphor were prepared.

|  | Example 21 | Example 22 | Example 23 | Example 24 | Example 25 |
|---|---|---|---|---|---|
| $SiO_2$ (g) | 22.66 | 22.66 | 22.66 | 22.66 | 22.66 |
| $Na_2SiF_6$ (g) | 6.45 | 6.45 | 6.45 | 6.45 | 6.45 |
| $Li_2CO_3$ (g) | 3.80 | 3.80 | 3.80 | 3.80 | 3.80 |
| $Na_2CO_3$ (g) | 1.8170 | 1.8170 | 1.8170 | 1.8170 | 1.8170 |
| MgO (g) | 8.12 | 7.79 | 7.63 | 7.30 | 6.96 |
| $TiO_2$ (g) | 0.1644 | 0.4931 | 0.6575 | 0.9862 | 1.3150 |
| (moles Ti/mole phosphor) | (0.02) | (0.06) | (0.08) | (0.12) | (0.16) |
| CR Brightness (fL) | 1.17 | 0.98 | 0.94 | 0.85 | 0.71 |

The titanium activated Na-Taeniolite phosphor samples exhibited a white emission under UV excitation. The broad emission peak was centered at about 540 nm. The optimum CR brightness, 1.17 fL, was given at 0.02 moles of Ti/mole of phosphor.

EXAMPLES 26–33

Manganese activated Na-taeniolite, Na(Mg$_{2-x}$Mn$_x$)LiSi$_4$O$_{10}$F$_2$, was prepared by mixing stoichiometric amounts of MgO, SiO$_2$, Na$_2$CO$_3$, Li$_2$CO$_3$, Na$_2$SiF$_6$, and MnCO$_3$ on a paint-shaker for 30 minutes. The starting materials thus mixed were charged into 100 ml alumina crucibles and fired at 915° C. for 36 hours, ground and refired at 850° C. for another 2 hours in 4% H$_2$/N$_2$ atmosphere to convert Mn$^{4+}$ to Mn$^{2+}$. Several different manganese activator levels between 0.02 and 0.12 moles of Mn per mole of phosphor were prepared by varying the amounts of MgO and MnCO$_3$.

|  | Example 26 | Example 27 | Example 28 | Example 29 | Example 30 |
| --- | --- | --- | --- | --- | --- |
| SiO$_2$ (g) | 22.66 | 22.66 | 22.66 | 22.66 | 22.66 |
| Na$_2$SiF$_6$ (g) | 6.45 | 6.45 | 6.45 | 6.45 | 6.45 |
| Li$_2$CO$_3$ (g) | 3.80 | 3.80 | 3.80 | 3.80 | 3.80 |
| Na$_2$CO$_3$ (g) | 1.8170 | 1.8170 | 1.8170 | 1.8170 | 1.8170 |
| MgO (g) | 8.21 | 8.12 | 8.04 | 7.96 | 7.79 |
| MnCO$_3$ (g) | 0.2364 | 0.4729 | 0.7094 | 0.9458 | 1.4188 |
| (moles Mn/mole phosphor) | (0.02) | (0.04) | (0.06) | (0.08) | (0.12) |
| CR Brightness (fL) | 1.21 | 1.38 | 1.39 | 1.40 | 1.24 |

The manganese activated Na-taeniolite phosphor samples exhibited a pink emission under UV, and red under a cathode ray excitation. The broad CR emission peak was centered at about 700 nm. The optimum CR brightness, 1.40 fL, was realized between 0.04 and 0.08 moles of manganese.

Another set of samples was prepared using (NH$_4$)$_2$SiF$_6$ in place of Na$_2$SiF$_6$. These samples were blended for 20 minutes, loaded into alumina crucibles and fired in the presence of a small amount of graphite or charcoal at 900° C. for 5 hours. The slightly reducing atmosphere was used to prevent the oxidation of Mn$^{+2}$ to Mn$^{+4}$. The fired samples were pulverized and sieved through a –100 mesh screen. The formation of Na-taeniolite was determined by x-ray diffraction. The fired samples had a brownish body color indicating the oxidation of Mn$^{+2}$ to Mn$^{+4}$. Portions of these samples were refired under N$_2$/5% H$_2$ at 900° C. for 2 hours to reduce the Mn$^{+4}$ to Mn$^{+2}$. The refired samples were pulverized, washed if necessary, and sieved through a –200 mesh screen. The brightness of the refired samples was compared to the single step fired samples. The luminescent intensity of the refired samples was considerably greater than the single step fired. All samples exhibited an emission maximum at about 695 nm typical of Mn$^{+2}$.

|  | Example 31 | Example 32 | Example 33 |
| --- | --- | --- | --- |
| SiO$_2$ (g) | 44.04 | 44.04 | 44.04 |
| (NH$_4$)$_2$SiF$_6$ (g) | 12.47 | 12.47 | 12.47 |
| Li$_2$CO$_3$ (g) | 7.39 | 7.39 | 7.39 |
| Na$_2$CO$_3$ (g) | 10.60 | 10.60 | 10.60 |
| MgO (g) | 16.12 | 15.80 | 15.48 |
| MnCO$_3$ (g) | 0 | 0.9196 | 1.839 |
| (moles Mn/mole phosphor) | (0) | (0.04) | (0.08) |
| CR Brightness (fL) | 1.06 | 1.302 | 0.847 |
| CR Brightness after 2nd firing (fL) | — | 1.505 | 1.401 |

EXAMPLES 34–40

Europium activated Na-taeniolite, Na(Mg$_{2-x}$Eu$_x$)LiSi$_4$O$_{10}$F$_2$, was prepared by mixing stoichiometric amounts of MgO, SiO$_2$, Na$_2$CO$_3$, LiF or Li$_2$CO$_3$, (NH$_4$)$_2$SiF$_6$, and EuF$_2$ (Eu$^{+2}$) or Eu$_2$O$_3$ (Eu$^{+3}$) on a paint-shaker for 20 minutes. The starting materials thus mixed were charged into alumina crucibles and fired. The mixtures containing Eu$^{+2}$ were fired at 900° C. for 5 hours in a N$_2$/5% H$_2$ atmosphere to prevent the Eu$^{+2}$ from oxidizing to Eu$^{+3}$. The mixtures containing Eu$^{+3}$ were fired in air at the same time and temperature. The fired samples were pulverized and sieved through a –200 mesh screen. Several different Eu activator levels were prepared having between 0 and 0.05 moles of Eu per mole phosphor.

|  | Example 34 | Example 35 | Example 36 | Example 37 |
| --- | --- | --- | --- | --- |
| Na$_2$CO$_3$ (g) | 10.60 | 10.60 | 10.60 | 10.60 |
| MgO (g) | 16.12 | 15.96 | 15.80 | 15.72 |
| SiO$_2$ (g) | 44.04 | 44.04 | 44.04 | 44.04 |
| (NH$_4$)$_2$SiF$_6$ (g) | 12.47 | 12.47 | 12.47 | 12.47 |
| LiF (g) | 5.20 | 5.20 | 5.20 | 5.20 |
| EuF$_2$ (g) | 0 | 0.759 | 1.519 | 1.899 |
| (moles Eu$^{+2}$/mole phosphor) | (0) | (0.02) | (0.04) | (0.05) |
| CR Brightness (fL) | 0.858 | 0.864 | 0.876 | 0.892 |

|  | Example 38 | Example 39 | Example 40 |
| --- | --- | --- | --- |
| Na$_2$CO$_3$ (g) | 10.60 | 10.60 | 10.60 |
| MgO (g) | 16.12 | 15.96 | 15.80 |
| SiO$_2$ (g) | 44.04 | 44.04 | 44.04 |
| (NH$_4$)$_2$SiF$_6$ (g) | 12.47 | 12.47 | 12.47 |
| Li$_2$CO$_3$ (g) | 7.39 | 7.39 | 7.39 |
| Eu$_2$O$_3$ (g) | 0 | 0.704 | 1.408 |
| (moles Eu$^{+3}$/mole phosphor) | (0) | (0.02) | (0.04) |
| CR Brightness (fL) | 1.086 | 1.018 | 0.859 |

The formation of Na-taeniolite was confirmed by X-ray diffraction. A minor phase of SiO$_2$ was also found however a longer firing time should lead to the formation of 100% Na-taeniolite. The Eu$^{+2}$ activated Na-taeniolite samples exhibited reasonably intense emission peaks at 360 and 380 nm under cathode ray excitation. The broad emission peak was centered at about 540 nm.

The samples synthesized with Eu$_2$O$_3$ resulted in typical Eu$^{+3}$ red-emitting phosphors under UV excitation with the major emission peak occurring at about 615 nm. However, under CR excitation, red, green and UV-blue emission were observed. The UV-blue and green emissions appear to be due to some impurities because the unactivated sample also exhibited these emissions.

Li-taeniolite Phosphors

EXAMPLES 41–45

Samples of Eu-activated Li-taeniolite, $Li[Mg_{2-x},Eu_x]LiSi_4O_{10}F_2$, were prepared by blending stoichiometric quantities of lithium nitrate and/or lithium carbonate ($LiNO_3$, $Li_2CO_3$), magnesium oxide (MgO), ammonium hexafluorosilicate ($(NH_4)_2SiF_6$), silicon dioxide ($SiO_2$), and europium fluoride ($EuF_3$) starting reagents to achieve the desired formulation and fired as described below. Samples for Eu concentrations of $0.02 \leq x \leq 0.20$ were prepared. Starting reagents were blended together for 20–30 minutes on a mechanical mixer. The mixtures were placed into alumina crucibles, covered with a lid, and then loaded into larger alumina crucibles containing graphite discs. The graphite produces a reducing atmosphere at elevated temperatures that is necessary to reduce europium to its divalent oxidation state. Mixtures were then fired at 1300° C. for 2 hours with an 8 hour heating/cooling ramp on both sides of the firing temperature. The samples were completely melted, forming a solid mass when cool. The fired materials were easily separated from the crucible by taking advantage of Li-taeniolite's exceptional water-swelling characteristics. The crucibles containing the samples were placed in a glass dish, and approximately 10–30 ml of deionized (DI) water were placed on each sample. As the material absorbed the water, it swelled causing the crucible to break. The crucible was physically removed from the sample and additional water was added until the sample formed a paste. Samples were then dried, pulverized, and sieved (if necessary). Each sample was analyzed by using X-ray powder diffraction to confirm the formation of Li-taeniolite.

Under UV excitation (254 nm), the samples displayed the blue emission typical of $Eu^{2+}$-activated materials, with a broad band centered near 450 nm. Although emission from CR excited samples was comparatively weak, the emission curves had essentially the same shape with a peak maximum at approximately 425 nm.

EXAMPLES 46–55

Samples of Ce- and Mn-activated Li-taeniolite were prepared by blending stoichiometric quantities of lithium nitrate and/or lithium carbonate ($LiNO_3$, $Li_2CO_3$), magnesium oxide (MgO), ammonium hexafluorosilicate ($(NH_4)_2SiF_6$), and silicon dioxide ($SiO_2$), starting reagents to achieve the desired formulation and fired as described below. Ce- and Mn-activated materials were prepared by introducing small amounts of $Ce^{3+}$ and $Mn^{2+}$ ions in the form of fluorides, oxides, or carbonates ($CeF_3$, $CeO_2$, $MnCO_3$) according to the following formula, $Li[Mg_{2-x},M_x^b]LiSi_4O_{10}F_2$ ($M^b$=Ce or Mn). Phosphors having Ce concentrations of 0.02 to 0.10 moles of Ce/mole of phosphor and Mn concentrations of 0.0025 to 0.10 moles of Mn/moles of phosphor were prepared. Starting reagents were blended together for 20–30 minutes on a mechanical mixer. The mixtures were placed into alumina crucibles and covered with a lid. These crucibles were then loaded into larger alumina crucibles containing graphite discs. The graphite produces a reducing atmosphere at elevated temperatures that is necessary to reduce Ce and Mn to their respective trivalent and divalent oxidation states. The mixtures were fired at 1300° C. for 2 hours with an 8 hour heating/cooling ramp on both sides of the firing temperature. The samples were completely melted, forming a solid mass when cool and were separated from the crucible by adding water to cause the material to swell. The samples were then dried, pulverized, and sieved (if necessary).

|  | Example 41 | Example 42 | Example 43 | Example 44 | Example 45 |
|---|---|---|---|---|---|
| $LiNO_3$ (g) | 14.96 | 14.50 | 14.38 | 14.19 | 13.83 |
| MgO (g) | 8.50 | 8.22 | 8.07 | 7.78 | 7.29 |
| $(NH_4)_2SiF_6$ (g) | 6.33 | 6.24 | 6.19 | 6.11 | 5.96 |
| $SiO_2$ (g) | 23.50 | 23.18 | 23.00 | 22.69 | 22.14 |
| $EuF_3$ (g) | 0.445 | 1.318 | 1.744 | 2.687 | 4.196 |
| (moles Eu/mole of phosphor) | (0.02) | (0.060) | (0.080) | (0.125) | (0.200) |
| UV Brightness (fL) | 2.33 | 2.93 | 3.55 | 5.89 | 4.72 |

| | $Li[Mg_{2-x},Ce_x]LiSi_4O_{10}F_2$ | | | | |
|---|---|---|---|---|---|
|  | Example 46 | Example 47 | Example 48 | Example 49 | Example 50 |
| $Li_2CO_3$ (g) | 7.88 | 7.83 | 7.78 | 7.73 | 7.69 |
| MgO (g) | 8.51 | 8.37 | 8.24 | 8.10 | 7.97 |
| $(NH_4)_2SiF_6$ (g) | 6.33 | 6.29 | 6.25 | 6.22 | 6.18 |
| $SiO_2$ (g) | 23.51 | 23.36 | 23.22 | 23.08 | 22.94 |
| $CeO_2$ (g) | 0.367 | 0.730 | 1.088 | 1.441 | 1.791 |
| (moles Ce/mole phosphor) | (0.02) | (0.04) | (0.06) | (0.08) | (0.10) |
| UV Brightness (254 nm) (fL) | 0.65 | 1.16 | 1.53 | 1.89 | 0.71 |

| | $Li[Mg_{2-x},Mn_x]LiSi_4O_{10}F_2$ | | | | |
|---|---|---|---|---|---|
|  | Example 51 | Example 52 | Example 53 | Example 54 | Example 55 |
| $Li_2CO_3$ (g) | 7.93 | 7.91 | 7.90 | 7.88 | 7.86 |
| MgO (g) | 8.65 | 8.55 | 8.45 | 8.25 | 8.15 |

| | | | | | |
|---|---|---|---|---|---|
| $(NH_4)_2SiF_6$ (g) | 6.37 | 6.36 | 6.35 | 6.33 | 6.32 |
| $SiO_2$ (g) | 23.65 | 23.62 | 23.58 | 23.50 | 23.46 |
| $MnCO_3$ (g) | 0.031 | 0.246 | 0.492 | 0.980 | 1.223 |
| (moles Mn/mole phosphor) | (0.0025) | (0.020) | (0.040) | (0.080) | (0.100) |
| Cr Brightness (fL) | 0.33 | 0.67 | 0.59 | 0.48 | 0.35 |

X-ray diffraction confirmed the formation of Li-taeniolite. Under UV photo-excitation (254 nm), Ce-activated samples displayed the blue emission typical of $Ce^{3+}$-activated materials, with a broad band centered near 425 nm. Emission from CR excited Ce-activated samples was comparatively weak. Mn-activated Li-taeniolite had negligible emission under UV photo-excitation. However, emission from the Mn-activated samples was deep red under CR excitation. The CR emission curve was a broad band (centered near 665 nm) typical of materials activated with $Mn^{2+}$ ions located at an octahedral site within the crystal lattice.

Co-activated Li-Taeniolite

EXAMPLES 56 and 57

Samples of Ce,Tb- and Eu, Mn- co-activated Li-taeniolite were prepared by blending stoichiometric quantities of lithium nitrate and/or lithium carbonate ($LiNO_3$, $Li_2CO_3$), magnesium oxide (MgO), ammonium hexafluorosilicate (($NH_4)_2SiF_6$), and silicon dioxide ($SiO_2$), starting reagents to achieve the desired formulation and fired as described below. Ce,Tb- and Eu,Mn-coactivated materials were prepared by introducing small amounts of $Ce^{3+}$, $Tb^{3+}$, $Eu^{2+}$, and $Mn^{2+}$ ions in the form of fluorides, oxides, or carbonates ($CeF_3$, $CeO_2$, $MnCO_3$) according to the following formula, $Li(Mg_{2-(x+y)}M_x^b M_y^c)LiSi_4O_{10}F_2$ ($M_x^b$=Ce or Eu, and $M_y^c$=Tb, or Mn). Samples for concentrations of Ce=0.04, Tb=0.02 and Eu=0.02, Mn=0.02 were prepared.

| | $Li[Mg_{1.94},Ce_{0.04}Tb_{0.02}]LiSi_4O_{10}F_2$ and $Li[Mg_{1.96},Eu_{0.02}Mn_{0.02}]LiSi_4O_{10}F_2$ | |
|---|---|---|
| | Example 56 | Example 57 |
| $Li_2CO_3$ (g) | 7.77 | 7.86 |
| MgO (g) | 8.23 | 8.41 |
| $(NH_4)_2SiF_6$ (g) | 6.25 | 6.32 |
| $SiO_2$ (g) | 23.20 | 23.46 |
| $EuF_3$ (g) | — | 0.445 |
| $CeF_3$ (g) | 0.830 | — |
| $TbF_3$ (g) | 0.454 | — |
| $MnCO_3$ (g) | — | 0.245 |
| (moles activator/mole phosphor) | ($Ce_{0.04},Tb_{0.02}$) | ($Eu_{0.02},Mn_{0.02}$) |
| Brightness (fL) | 6.20 (UV 254 nm) | 0.50 (CR) |

Starting reagents were blended together for 20–30 minutes on a mechanical mixer. The mixtures were placed into alumina crucibles and covered with a lid. These crucibles were then loaded into larger alumina crucibles containing graphite discs. The graphite produces a reducing atmosphere at elevated temperatures that is necessary to reduce Mn and Eu to a divalent oxidation state and Ce to a trivalent oxidation state. Mixtures were then fired at 1300° C. for 2 hours with an 8 hour heating/cooling ramp on both sides of the firing temperature. The samples were completely melted, forming a solid mass when cool and were separated from the crucibles by adding water to cause the material to swell. Samples were then dried, pulverized, and sieved (if necessary). Each sample was analyzed by using X-ray powder diffraction to confirm the formation of Li-Taeniolite.

Under UV photo-excitation (254 nm), Ce,Tb-coactivated samples displayed the green emission typical of $Tb^{3+}$-activated materials, with an emission peak maximum located at approximately 540 nm. Emission from CR excited Ce,Tb-coactivated samples was negligible. Eu,Mn-coactivated Li-Taeniolite had negligible emission under UV photo-excitation. However, emission from under CR excitation was red. The emission curve was a combination of two broad bands—one centered near 400 nm (from $Eu^{2+}$) and one at approximately 690 nm (from $Mn^{2+}$).

While there have been shown what are at present considered to be the preferred embodiments of the invention, it will be apparent to those skilled in the art that various changes and modifications can be made herein without departing from the scope of the invention as defined by the appended claims.

We claim:

1. A phosphor having the general formula $M^a(Mg_2,M_x^b,M_y^c)LiSi_4O_{10}F_2$, where $M^a$ is Na or Li; $M^b$ and $M^c$ are selected from Pb, Nb, Tb, Ti, Sn, Mn, Eu, or Ce; x is from about 0.0025 to about 0.2; and y is from 0 to about 0.2.

2. The phosphor of claim 1 wherein $M^a$ is Na.

3. The phosphor of claim 2 wherein y=0.

4. The phosphor of claim 3 wherein $M^b$ is Pb and x is from 0.01 to about 0.14.

5. The phosphor of claim 4 wherein x is from about 0.04 to 0.06.

6. The phosphor of claim 3 wherein $M^b$ is Nb and x is from 0.02 to about 0.11.

7. The phosphor of claim 6 wherein x is about 0.11.

8. The phosphor of claim 3 wherein $M^b$ is Tb and x is from 0.04 to about 0.14.

9. The phosphor of claim 8 wherein x is about 0.10.

10. The phosphor of claim 3 wherein $M^b$ is Sn and x is from 0.004 to about 0.04.

11. The phosphor of claim 10 wherein x is about 0.02.

12. The phosphor of claim 3 wherein $M^b$ is Ti and x is from 0.02 to about 0.16.

13. The phosphor of claim 12 wherein x is about 0.02.

14. The phosphor of claim 3 wherein $M^b$ is Mn and x is from 0.02 to about 0.12.

15. The phosphor of claim 14 wherein x is about 0.04 to 0.08.

16. The phosphor of claim 3 wherein $M^b$ is Eu and x is from 0.02 to about 0.05.

17. The phosphor of claim 16 wherein x is about 0.05.

18. The phosphor of claim 1 wherein $M^a$ is Li.

19. The phosphor of claim 18 wherein y=0.

20. The phosphor of claim 19 wherein $M^b$ is Eu and x is from 0.02 to about 0.20.

21. The phosphor of claim 20 wherein x is about 0.125.

22. The phosphor of claim 19 Wherein $M^b$ is Ce and x is from 0.02 to about 0.10.

23. The phosphor of claim 22 wherein x is about 0.08.

24. The phosphor of claim 19 wherein $M^b$ is Mn and x is from 0.0025 to about 0.10.

25. The phosphor of claim 24 wherein x is about 0.02.

26. The phosphor of claim 18 wherein $M^b$ is Ce, $M^c$ is Tb, x is 0.04 and y is about 0.02.

27. The phosphor of claim 18 wherein $M^b$ is Eu, $M^c$ is Mn, x is 0.02, and y is about 0.02.

28. A method of making a phosphor having a general formula $M^a(Mg_2,M_x^b,M_y^c)LiSi_4O_{10}F_2$, where $M^a$ is Na or Li, $M^b$ and $M^c$ are selected from Pb, Nb, Tb, Ti, Sn, Mn, Eu, or Ce, and x is from about 0.0025 to about 0.2 and y is from 0 to about 0.2, the method comprising the steps of:

forming a mixture of stoichiometric amounts of $Na_2CO_3$ and $Li_2CO_3$ or LiF, or $Li_2CO_3$ and $LiNO_3$, and MgO, $SiO_2$, $Na_2SiF_6$ or $(NH_4)_2SiF_6$ and an oxide, halide or carbonate of $M^b$ and $M^c$; and firing the mixture at a temperature between about 900° C. to about 1300° C. for between about 5 hours to about 36 hours to form the phosphor.

29. The method of claim 28 wherein a carbonaceous source is fired with the mixture to produce a reducing atmosphere.

30. The method of claim 28 wherein the mixture is fired at about 915° C. for between about 15 hours to about 18 hours, ground, and refired at about 915° C. for between about 12 hours to about 15 hours to react substantially all of the $SiO_2$.

31. The method of claim 28 wherein the mixture is subjected to a second firing in a $N_2/4$–$5\%H_2$ atmosphere at between about 850° C. to 900° C. for about 2 hours.

* * * * *